United States Patent [19]
Hueftle et al.

[11] Patent Number: 5,271,272
[45] Date of Patent: Dec. 21, 1993

[54] FLUID FLOW RATE MEASURING ELEMENT

[75] Inventors: Gerhard Hueftle, Aspach; Heinz Rilling, Eberdingen, both of Fed. Rep. of Germany

[73] Assignee: Robert Bosch GmbH, Stuttgart, Fed. Rep. of Germany

[21] Appl. No.: 880,460

[22] Filed: May 8, 1992

[30] Foreign Application Priority Data

May 8, 1991 [DE] Fed. Rep. of Germany ....... 4115040

[51] Int. Cl.$^5$ .............................................. G01F 1/68
[52] U.S. Cl. .................................. 73/204.26; 73/118.2
[58] Field of Search ........... 73/204.26, 204.16, 204.25, 73/204.23, 118.2

[56] References Cited

U.S. PATENT DOCUMENTS

| | | | |
|---|---|---|---|
| 4,498,337 | 2/1985 | Gruner | 73/204.26 |
| 4,624,138 | 11/1986 | Ono et al. | 73/204.26 |
| 4,777,820 | 10/1988 | Hecht et al. | 73/204.26 |
| 4,831,876 | 5/1989 | Porth et al. | 74/204.26 |
| 4,841,769 | 6/1989 | Porth et al. | 73/204.26 |
| 5,038,610 | 8/1991 | Diehl et al. | 73/204.26 |

FOREIGN PATENT DOCUMENTS

| | | |
|---|---|---|
| 0271659 | 6/1988 | European Pat. Off. . |
| 0271660 | 6/1988 | European Pat. Off. . |
| 3638738 | 5/1988 | Fed. Rep. of Germany . |

*Primary Examiner*—Richard E. Chilcot, Jr.
*Assistant Examiner*—Harshad Patel
*Attorney, Agent, or Firm*—Edwin E. Greigg; Ronald E. Greigg

[57] ABSTRACT

A measuring element for a device for determining the mass of a flowing medium. The measuring element has a plurality of resistor tracks exposed to the flowing medium, and a substrate carrying the resistor tracks, on the surface of which substrate the resistor tracks are disposed, separated from one another. To prevent alteration of the characteristic curve of the measuring element as a consequence of the provision of temperature decoupling slits in the substrate, transversely to the flow direction, the resistor tracks are disposed in succession, as viewed in the flow direction, in stairstep fashion with steps that protrude past the respective preceding resistor track. The substrate is notched in accordance with the stairstep shape of the resistor tracks, in such a manner that one leading edge is formed along each step of the resistor tracks, so that the oncoming flow to the various resistor tracks is unaffected by the preceding step.

18 Claims, 2 Drawing Sheets

FLUID FLOW RATE MEASURING ELEMENT

BACKGROUND OF THE INVENTION

The invention is based on a measuring element for a device for determining the mass, or flow rate, of a flowing medium, in particular the aspirated air in internal combustion engines.

In such devices, also known as hot film air flow rate meters, the resistor paths of a temperature sensor and a compensation resistor on the one hand and the resistor path of the measuring resistor on the other, together with two compensation resistors, form a Wheatstone bridge, the bridge diagonal voltage of which is applied to a servo amplifier. The output voltage of the servo amplifier serves as a heating voltage for the heating resistor of the measuring element. The resistor tracks for the measuring and heating resistors of the measuring element are disposed on the substrate in such a way that a good thermal contact exists between them. As a result, the measuring resistor is heated to an excess temperature that is far above the temperature of the medium. If the flow quantity flowing across the measuring element changes, then the Wheatstone bridge is detuned, because the altered convective heat transfer changes the temperature of the measuring resistor as well, and because the measuring resistor has a temperature coefficient other than zero. The servo amplifier thereupon changes the output current for the heating resistor. Via the closed control loop, changes in the measuring resistor due to an outgoing or incoming quantity of heat are compensated for by varying the heating output of the heating resistor. The heating current or the output voltage of the servo amplifier is thus a measure of the flow rate of the flowing medium. Temperature fluctuations in the flowing medium are compensated for by the series connection of the temperature sensor and the compensation resistor.

In a known measuring element (German Patent Application 36 38 138 A1; U.S. Pat. No. 4,777,820) of the type referred to at the outset, for the device described, the distribution of the resistor tracks on the substrate is such that the resistor tracks are lined up with one another, parallel to one another in the flow direction. The resistor track for the compensation resistor is disposed between the resistor track for the temperature sensor and the resistor track for the measuring resistor, on the same side of the substrate, and the resistor track for the heating resistor is disposed on the other side of the substrate, directly opposite the resistor track for the measuring resistor. The various resistor tracks are separated from one another by slits extending transversely to the flow direction in the substrate; this brings about a temperature decoupling between the resistor tracks. As a result of these separating slits, the substrate has three tongues of equal length, of which the first two tongues in the flow direction each have one resistor track, while the last tongue in the flow direction has the resistor tracks for the measuring resistor and the heating resistor.

It has been found that despite careful manufacture and optimized adhesive bonding, spreading apart of the tongues cannot be precluded, and deviations of the tongues from the optimal alignment are relatively frequent and are of variable magnitude. As the flowing medium flows around the measuring element, this spreading of the tongues has a major influence on the form of the boundary layer and leads to increased amounts of rejects for the sake of the required characteristic curve of the measuring element.

OBJECT AND SUMMARY OF THE INVENTION

The measuring element according to the invention has the advantage over the prior art that the unsuitable features associated with spreading of the tongues are avoided.

In the first case, the slits extending transversely to the flow direction are omitted, and the temperature decoupling of the resistor track of the measuring resistor from the other resistor tracks, which is necessary for a compact layout, is undertaken by means of a slit parallel to the flow direction. As a result, and because of the provision of an unprinted smooth leading side upstream of the resistor track of the measuring resistor, the measuring element is not affected by spreading of the tongues. Preferably, the resistor tracks of the measuring resistor and of a necessary heating resistor are disposed on different sides of the substrate, opposite one another, while the resistor tracks of the measuring resistor and the other resistor tracks are located on the same side of the substrate.

In another case, the various resistor tracks undergo a direct onflow of the flowing medium as a result of the stairstep-like graduation of the measuring element. As a result, the measuring element is not affected by spreading of the tongues, even if in a further embodiment of the invention, if needed for further temperature decoupling, slits are made in the substrate transversely to the flow direction, aligned with the leading edges of the various resistor tracks.

In the measuring element of the invention, the complicated, labor-intensive test process for tongue spreading is dispensed with, which makes the production process more economical. The outer contour of the substrate is laser-cut from a large substrate, in the first variant of the invention in a simple rectangular form, and in the second variant of the invention as a rectangular form with a stairstep contour extending along its one long edge oriented in the flow direction.

In both variants of the invention, the leading edge of the substrate or the leading edges of the various stairsteps can be shaped in streamlined form, to adapt to the flow around the measuring element.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
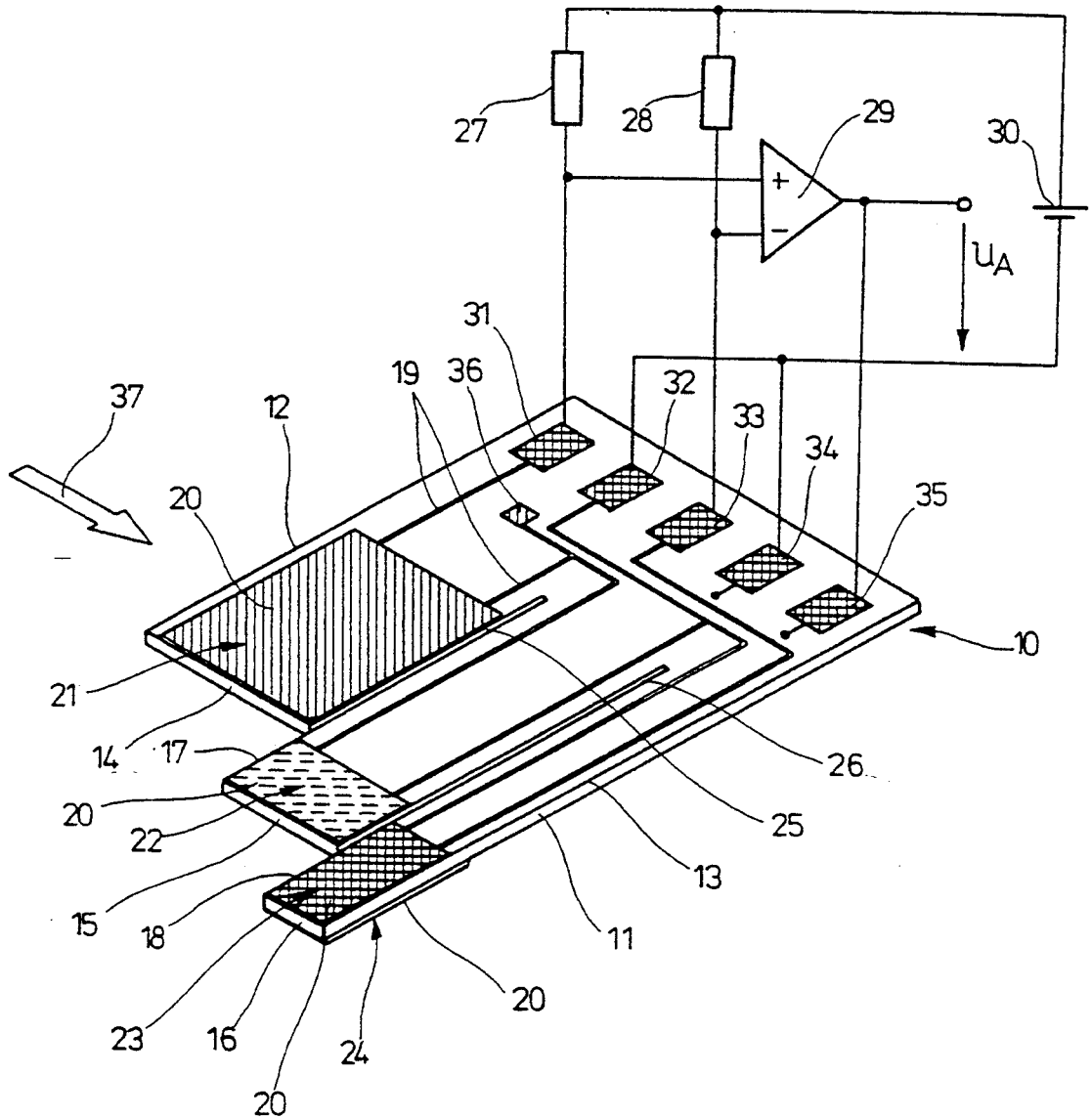
FIG. 1 is a perspective view of a measuring element for a hot film air flow rate meter and a circuit diagram for its electrical circuit arrangement.

The hot film air flow rate meter sketched in FIG. 1, as an example of a device for determining the mass of a generalized flowing medium, has a measuring element 10 that is exposed to the flowing medium, in this case air, and that in the case of internal combustion engines is disposed in a bypass around the air intake pipe. The flow direction of the flowing air is indicated by the arrow 37. The measuring element 10 comprises a substrate 11, which is cut out from a large substrate by a laser, and a plurality of resistor tracks 20 that are disposed on the surface of the substrate 11. The substrate 11 is rectangular in shape, and the long side in the flow direction is cut out in stairstep fashion, so that viewed in the flow direction, three steps 14, 15, 16 are created from the leading edge 12 of the substrate 11 located farthest upstream to the trailing edge 13 located downstream; each subsequent step 15, 16 protrudes past the preceding step 14, 15. The first step 14 is defined by the leading edge 12 that is farthest upstream, while the next two steps 15, 16 have leading edges 17 and 18, respectively. One resistor track 20 is disposed in each step 14–16; the first step 14 has the resistor track 20 for a temperature sensor 21, the second step 15 has the resistor track 20 for a compensation resistor 22, and the third step 16 has a resistor track 20 on one side for a measuring resistor 23 and a resistor track 20 on the underside for a heating resistor 24. The measuring resistor 23 is disposed on the same side of the substrate 11, in this case on the top of the substrate, as the temperature sensor 21 and the compensation resistor 22, while the heating resistor 24 is on the opposite substrate side of the third step 16, that is, the underside of the substrate. The width of the steps 14–16 and thus the width of the resistor tracks 20 decreases from the upstream leading edge 12 to the trailing edge 13 of the substrate 11. In alignment with the leading edges 17 and 18, two slits 25, 26 are made transversely to the flow direction 37; they serve the temperature decoupling among the resistor tracks 20.

Five contact faces 31–35 are lined up along the line side opposite the stepped long side of the measuring element 10; they are applied, spaced apart from one another, on the top of the substrate 11 that also carried the resistor tracks 20 for the temperature sensor 21, compensation resistor 22 and measuring resistor 23. The contact faces 31–35 are connected to the various resistor tracks 20 via printed conductor tracks 19; specifically, the contact face 31 is connected to the temperature sensor 21, the contact face 32 is connected to the compensation resistor 22 and the measuring resistor 23, the contact face 33 is connected to the measuring resistor 23, and the two contact faces 34, 35 are connected to the heating resistor 24. A conductor track 19 also connects the temperature sensor 21 to the compensation resistor 22, which can be sensed by means of a contact face 36. The other circuit components of the hot film air flow rate meter are connected to the contact faces 31–35 of the measuring element 10 in accordance with the circuit diagram shown in FIG. 1. The series circuit of the temperature sensor 21 and compensation resistor 22, on the one hand, and measuring resistor 23, on the other, is in a Wheatstone bridge circuit with two resistors 27, 28; the bridge diagonal voltage is applied to a servo amplifier 29 embodied as a differential amplifier. A direct voltage 30 serves to supply power to the Wheatstone bridge circuit. The output voltage $U_A$ of the servo amplifier 29 is applied to the heating resistor 24.

The mode of operation of the hot film air flow rate meter is known per se and is briefly as follows:

The output current of the servo amplifier 29 causes heating of the heating resistor 24; the heating output at the heating resistor 24 is determined substantially by the bridge diagonal voltage at the servo amplifier 29. The heating resistor 24, which is in good thermal contact with the measuring resistor 23, is thus brought to an excess temperature located far above the temperature of the flowing air. If the quantity of air flowing over the measuring element 10 now varies, then because of the altered convective heat transfer the temperature of the measuring resistor 23 varies as well, and the Wheatstone bridge circuit is detuned. The servo amplifier 29 thereupon changes the output current heating resistor 24. Via the closed control loop, changes in the measuring resistor 23 due to an outgoing or incoming quantity of heat are thus always compensated for by varying the heating output of the heating resistor 24, so that the measuring resistor 23 is always kept at a predetermined temperature. The heating current or the output voltage $U_A$ of the servo amplifier 29 is thus a measure of the flow rate of the air. Temperature fluctuations in the flowing air are compensated for by the series circuit of the temperature sensor 21 and the compensation resistor 22.

Since each resistor track 20, of the temperature sensor 21, the compensation resistor 22, and the measuring and heating resistors 23, 24, has its own leading edge 12, 17 and 18, respectively, the measuring element 10 described is not affected by a spreading of the individual steps transversely to the top or bottom of the substrate 11 that can occur after the slits 25, 26 are made, since even if the various steps 14–16 should spread apart, the flow arriving at the various resistor tracks 20 remains virtually unaffected by the preceding step 14 or 15. To adapt to the flow around the measuring element, the leading edges 12, 17, 18 can be shaped as needed.

Figure 2:
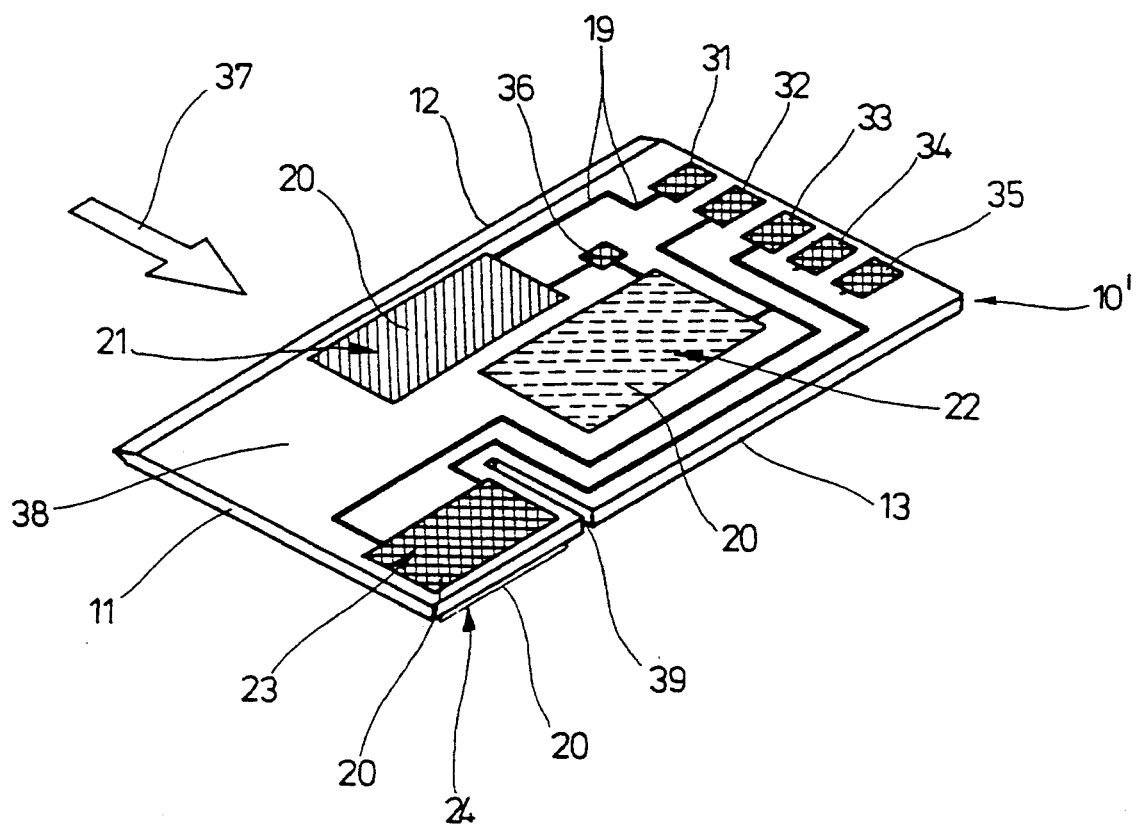
FIG. 2 is a perspective view of a measuring element for a hot film air flow rate meter in a second exemplary embodiment.

The measuring element 10' of FIG. 2 differs from the measuring element 10 of FIG. 1 in its outer contour, which here is rectangular, and in a different distribution of the resistor tracks 20 on the surface of the substrate 11. To the extent that identical components match those of FIG. 1, they are provided with the same reference numerals. The resistor track 20 for the temperature sensor 21 is again disposed near the leading edge 12 of the substrate 11, and the resistor tracks 20 for the measuring resistor 23 and heating resistor 24 are disposed near the trailing edge 13 of the substrate 11. The resistor track 20 for the compensation resistor 22 is located downstream of the resistor track 20 of the temperature sensor 21. The two resistor tracks 20 of the measuring and heating resistors 23 and 24, which are in turn applied to the top and bottom respectively, of the substrate 11 are laterally offset from the other two resistor tracks 20, so that the surface region 38 of the substrate 11 located upstream of the measuring resistor 23 in the flow direction 37 is unoccupied. Additionally, the "hot zone" of the measuring element 10', formed by the resistor tracks 20 of the heating and measuring resistors 24, 23, is separated from the other two resistor tracks 20 for the temperature sensor 21 and the compensation resistor 22 by a slit 39, which is made in the substrate 11 parallel to the flow direction 37, beginning at the trailing edge 13; the result is a temperature decoupling from these resistor tracks 20. The leading edge 12 of the measuring element 10' is streamlined, in this case being wedge-shaped. The various resistor tracks 20 are again connected via the conductor tracks 19 to the contact faces 31, 35, to which the circuit arrangement shown in FIG. 1 should be connected in the same manner as in FIG. 1.

This embodiment of the measuring element 10' also has the advantage of being unaffected by spreading of the substrate zones separated by the slit 39, because the course of the slit is made parallel to the air flow direction 37, so that the oncoming flow to the various resistor tracks 20 remains unaffected even if spreading occurs. Since the oncoming flow does not alter even if spreading occurs, the characteristic curve of the temperature element 10' remains unchanged. Compared with the measuring element 10, the measuring element 10' has the advantage of a simple outside contour, which can be favorably made from the large substrate. It has more resistance to vibration and shock than the measuring element 10 of FIG. 1 because the vibration length is short and because the measuring and heating resistors 23, 24 can be embodied in square form.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A measuring element for a device for determining a flow rate of a flowing medium of an aspirated air in internal combustion engines, having a plurality of resistor tracks exposed to the flowing medium and having a substrate carrying the resistor tracks, on the surface of said substrate the resistor tracks are distributed in such a way that a resistor track (20) for a measuring resistor is located in a flow direction near a downstream trailing edge of the substrate, an upper surface region (38) of the substrate (11) is unoccupied between the leading edge (12) upstream in the flow direction (37) and the resistor track (20) for the measuring resistor (23), and a substrate zone carrying the resistor track for the measuring resistor (23) is separated by a slit from every other resistor track (20) of said plurality of resistor tracks, and said slit (39) extends in the flow direction (37) beginning at a trailing edge (13) of the substrate (11).

2. A measuring element as defined by claim 1, in which the resistor tracks (20) for the measuring resistor (23) and a heating resistor (24) are disposed on the top and bottom of the substrate (11), the resistor track (20) for the measuring resistor (23) being located on the same, top side of the substrate (11) as the remaining resistor tracks (20).

3. A measuring element as defined by claim 2, in which the resistor tracks (20) for a temperature sensor (21) and a compensation resistor (22) are disposed in succession in the flow direction (37), and that the resistor tracks (20) for the measuring and heating resistors (23, 24) are laterally offset from the resistor track (20) for the compensation resistor (22) opposite of the slit.

4. A measuring element as defined by claim 1, in which the resistor tracks (20) are electrically conductively connected to separate spaced contact faces (31–35), disposed on the top of the substrate (11), that serve to connect the device to an electrical circuitry.

5. A measuring element as defined by claim 2, in which the resistor tracks (20) are electrically conductively connected to separate spaced contact faces (31–35), disposed on the top of the substrate (11), that serve to connect the device to an electrical circuitry.

6. A measuring element as defined by claim 3, in which the resistor tracks (20) are electrically conductively connected to separate spaced contact faces (31–35), disposed on the top of the substrate (11), that serve to connect the device to an electrical circuitry.

7. A measuring element as defined by claim 1, in which the leading edge (12) of the substrate (11) are embodied in streamlined fashion, for instance being wedge-shaped.

8. A measuring element for a device for determining the flow rate of a flowing medium, of an aspirated air in internal combustion engines, having a plurality of resistor tracks exposed to the flowing medium and having a substrate carrying the resistor tracks, on the surface of said substrate the resistor tracks are distributed in such a way that the resistor track for a measuring resistor is located in the flow direction near a downstream trailing edge of the substrate, and in which the resistor tracks (20) are disposed in succession in the flow direction (37) in stairstep fashion, with steps (15, 16) protruding past the respective preceding resistor track (20), and the substrate (11) is embodied, in accordance with the stairstep form of the resistor tracks (20), such that first, second and third leading edges (12, 17, 18) are formed, one along each step (14–16) of the resistor tracks (20).

9. A measuring element as defined by claim 8, in which slits (25, 26) for temperature decoupling of the resistor tracks (20) extend parallel to one another, transversely to the flow direction (35), and in an extension of the leading edges (17, 18).

10. A measuring element as defined by claim 8, in which the width, viewed in the flow direction (37), of the resistor tracks (20) lined up in succession decreases from the leading edge (12) that is upstream in the flow direction (37) to the downstream trailing edge (13) of the substrate (11), and that the resistor track (20) for a compensation resistor (22) is located between the resistor track (20) for a temperature sensor (21) and the resistor track (20) for the measuring resistor (23) and together with the latter on the same top side of the substrate (11).

11. A measuring element as defined by claim 9, in which the width, viewed in the flow direction (37), of the resistor tracks (20) lined up in succession decreases from the leading edge (12) that is upstream in the flow direction (37) to the downstream trailing edge (13) of the substrate (11), and that the resistor track (20) for a compensation resistor (22) is located between the resistor track (20) for a temperature sensor (21) and the resistor track (20) for the measuring resistor (23) and together with the latter on the same top side of the substrate (11).

12. A measuring element as defined by claim 10, in which the resistor track (20) for a heating resistor (24) is disposed on the underside of the substrate (11), directly opposite the resistor track (20) for the measuring resistor (23).

13. A measuring element as defined by claim 11, in which the resistor track (20) for a heating resistor (24) is disposed on the underside of the substrate (11), directly opposite the resistor track (20) for the measuring resistor (23).

14. A measuring element as defined by claim 8, in which the resistor tracks (20) are electrically conductively connected to separate spaced contact faces (31–35), disposed on the top of the substrate (11), that serve to connect the device to an electrical circuitry.

15. A measuring element as defined by claim 9, in which the resistor tracks (20) are electrically conductively connected to separate spaced contact faces (31–35), disposed on the top of the substrate (11), that serve to connect the device to an electrical circuitry.

16. A measuring element as defined by claim 10, in which the resistor tracks (20) are electrically conductively connected to separate spaced contact faces (31–35), disposed on the top of the substrate (11), that serve to connect the device to an electrical circuitry.

17. A measuring element as defined by claim 12, in which the resistor tracks (20) are electrically conductively connected to separate spaced contact faces (31–35), disposed on the top of the substrate (11), that serve to connect the device to an electrical circuitry.

18. A measuring element as defined by claim 8, in which the leading edges (12, 17, 18) of the substrate (11) are embodied in streamlined fashion, for instance being wedge-shaped.

* * * * *